Figure 1:
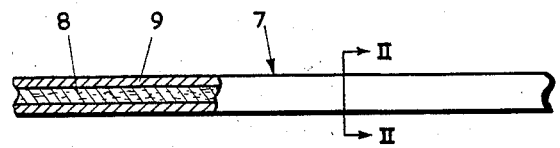

Dec. 16, 1958     L. BIHALY     2,864,151
FUSED FABRIC ASSEMBLIES
Filed Dec. 2, 1952

Inventor Lajos Bihaly
by Desvre Steinhez
attorney

United States Patent Office 2,864,151
Patented Dec. 16, 1958

2,864,151

FUSED FABRIC ASSEMBLIES

Lajos Bihaly, London, England

Application December 2, 1952, Serial No. 323,705

Claims priority, application Great Britain January 1, 1952

8 Claims. (Cl. 28—78)

This invention relates to so-called fused fabric assemblies, that is semi-stiff fabrics composed of two or more separately manufactured fabric plies superimposed upon one another and adhesively united together by means of thermoplastic elements contained in at least one of the plies. Commonly the assembly consists of three plies of woven or knitted fabric, the two outer plies being normal fabrics composed wholly of threads or strands of cotton, linen, wool or other non-thermoplastic material, while the central ply (which is usually referred to as the interlining) contains both non-thermoplastic strands and strands which are composed at least in part of thermoplastic material. The thermoplastic strands in the interlining being spaced apart from one another by the non-thermoplastic strands, the plies become adhesively united together over a large number of small separate areas only and the assembly remains permeable to air and moisture. The invention is not concerned with the type of assembly wherein the adhesive appears as a continuous layer or film, coated or otherwise applied to one or more of the surfaces of the constituent fabrics.

Hitherto, the thermoplastic strands used in interlinings for fused fabric assemblies have been made of cellulose acetate, which has a melting-point above the maximum temperature to which the non-thermoplastic constituents of the assembly can safely be subjected. Accordingly, either the interlining must be treated with a plasticiser for the cellulose acetate, so that the latter will become adhesive when subjected to a suitable degree of heat and pressure or (more usually) the whole fabric assembly is treated with a solvent for the cellulose acetate after making up into the form of the required garment, or other article, and immediately before subjecting the assembly to heat and pressure to effect fusion.

In either case adhesion between the fabric layers is effected as a result of pressure acting on the more or less freely flowing adhesive to force the adhesive into the pores and around the fibres of the solid yarns. It is therefore of great advantage to have most of the adhesive located between the outer fabric layer and the interlining and not buried within the thickness of the latter. This is achieved by weaving the adhesive yarn with a large amount of crimp in comparison with the non-adhesive yarns in the interlining, to lift the adhesive out of the plane of the non-adhesive yarns. For example, in a form of interlining material now commercially available the acetate warp strands in a piece of fabric 100 yards long measure about 130 yards, whereas the cotton warp strands measure less than 110 yards.

The present invention, however, is concerned with interlinings for fused fabric assemblies in which the thermoplastic material, which forms or is included in some of the strands of the fabric, while solid at atmospheric temperatures melts, or softens sufficiently to become adhesive, at a temperature below the maximum to which the other constituents of the assembly can safely be subjected. When such an interlining is used, no treatment with plasticisers or solvents is necessary, fusion of the assembled fabric plies being effected simply by the application of heat and pressure.

One thermoplastic material which has been found satisfactory for use is polythene (polyethylene), which has a melting point of about 105° C. The manner of carrying the invention into practice is described below with reference to the use of this material, but the invention includes also the use of other thermoplastic materials having similar properties, for example polystyrene.

In the commercially available threads of thermoplastic materials suitable for use in interlining fabric, the thermoplastic material is in a molecularly orientated condition as a result of the extrusion and/or drawing operations used in the manufacture of the thread. On heating such a thread, disorientation of the material occurs and, unless it is forcibly restrained, the thread contracts longitudinally and increases in thickness. In the case of polythene the degree of contraction is substantial, and an unrestrained thread heated to just below its melting-point may be reduced to approximately half its original length. Accordingly, the mere substitution of the commercially available polythene threads for the cellulose acetate threads normally used in the interlining would not result in the production of a satisfactory fused fabric assembly and special measures of some kind are required.

The contraction of the polythene threads during the fusing operation will be avoided if the polythene is already in the relaxed, or random orientated, state. Such disorientation of the polythene could be effected by heating commercially available polythene threads to a temperature near their melting point, prior to weaving them into the interlining.

Provided that any stretching of the threads is avoided, threads so treated will not shrink upon heating until the temperature passes the highest temperature reached during the pre-treatment. However, the tenacity of the threads is reduced by the molecular disorientation and in weaving threads treated in the above manner it would be difficult if not impossible to avoid stretching them to some extent at least. Any such stretching results in at least some degree of molecular reorientation, so that contraction will again occur when the threads are heated during the fusing operation.

In accordance with the present invention the above-mentioned difficulties are avoided by the employment of compound strands, one constituent of which is the thermoplastic material in relaxed state while another constituent is less readily extensible than the thermoplastic material, so that it resists a stretching of the strands which would result in at least partial molecular orientation of the thermoplastic material. The invention provides a number of methods of preparing such compound strands.

Relaxation or molecular disorientation of the thermoplastic material can be effected before, during or after compounding, as illustrated by the following examples.

*Example 1*

A polythene monofil of $125\mu$ diameter is relaxed by passage through boiling water. The peripheral velocity of the feed rollers is about twice that of the take-up rollers to allow for the contraction of the monofil. The contracted monofil is then guided along a path close to and parallel with the path of a cellulose acetate monofil of about $50\mu$ diameter, travelling at the same speed as the polythene monofil. One, two or three of such pairs are produced in close proximity and united by a slight twist of one turn for every 2 to 3 inches of yarn.

This compound yarn will lay flat in weaving, so that sufficient adhesive will be in contact with the outer layers during fusing. It will also permit weaving, finishing and cutting without contraction of the polythene or of the whole fabric and will not contract during fusing.

*Example 2*

A cellulose acetate monofil of 50μ diameter, or a cotton, viscose, or other comparatively non-thermoplastic yarn of equivalent dimension, is coated with a layer of polythene extruded from the molten state, with or without the assistance of a solvent for the polythene like xylene, onto the central filament or yarn in such a way as to leave the polythene in the random-orientated state. This can be achieved by sufficiently slow cooling, after passage of the yarn and coat through the coating orifice. The solid, coated yarn should have a diameter of 125 to 200μ. It may be difficult to weave such a yarn with any crimp, but experience has shown that with the support provided by the hard core of this yarn, no crimp is necessary to produce adhesion. Since the polythene solidifies in the relaxed state, no tension due to thermal forces is created during finishing or fusing, thus the absence of crimp does not cause the fabric or fabric assembly to contract in these processes.

*Example 3*

A coated yarn is produced as in Example 2, except that no precautions are taken to cause the polythene to solidify in the relaxed state. Disorientation of the polythene is effected subsequently by passage of the yarn through a heated medium between two pairs of rollers, or round the periphery of one roller, keeping the yarn velocity constant until the polythene resolidifies. This process produces a solid coating in the random-orientated phase, equivalent to the yarn produced by slow cooling, as in Example 2.

*Example 4*

A multifilament yarn of polythene composed of 20 single filaments of 40μ diameter (equivalent to about 20 x 10 denier) is passed through a device which untwists the filaments if necessary and spaces them slightly apart. A multifilament yarn of cellulose acetate composed of 20 single filaments of 3 denier each (equivalent to somewhat less than 20μ filament diameter) is treated in the same way and the single strands of each yarn are intermingled to produce an evenly mixed yarn of 40 filaments. This is slightly twisted, then passed through a heated bath and a cooling chamber while it is so guided and constrained by rollers as to prevent contraction. This yarn can be woven with considerable crimp, and the crimp retained substantially undiminished in spite of the heat treatment the fabric may encounter during finishing and will encounter during fusing.

Figure 2:
Figure 3:
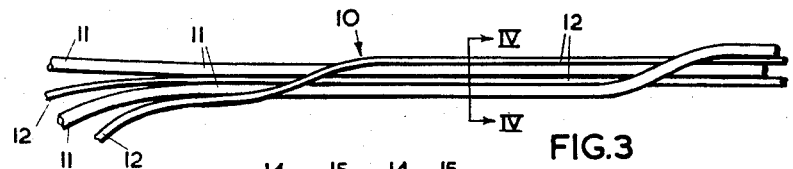
Figure 4:
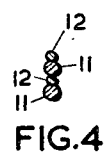
Figure 5:
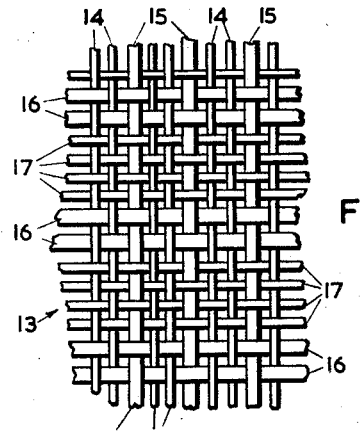
Figure 6:
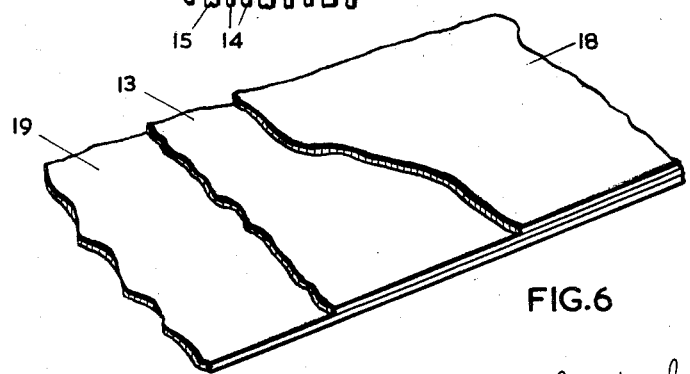

In the accompanying drawing Figure 1 is a plan view of a coated strand, shown partly in axial section and Figure 2 is a cross-section through the strand taken on the line II—II of Figure 1; Figure 3 is a plan view of a plied strand and Figure 4 is a cross section through the strand, taken on the line IV—IV of Figure 3; Figure 5 is a plan view of a fragment of mixed fabric; and Figure 6 is a perspective view of a fragment of a fused fabric assembly with parts broken away to show the structure.

The coated strand 7 shown in Figures 1 and 2 comprises a core yarn 8 of low extensibility and a coating 9 of a material which softens sufficiently to become adhesive upon heating to a temperature insufficient to damage the core 8. The materials used and the diameters of the core yarn and of the completed strand may be as stated in Example 2.

The plied strand 10 shown in Figures 3 and 4 is composed of two filaments 11 of a thermoplastic material and two thinner filaments 12 of a material which is relatively inextensible and is not damaged by a degree of heat sufficient to render adhesive the material of filaments 11. The four constituent filaments, which are shown frayed out separate from one another at the left hand end of Figure 3, are united by a slight twist, the degree of twist being exaggerated in the drawing for purposes of illustration. When tensioned as in a woven fabric, the yarn lies flat, the constituent filaments lying side by side with one another over the greater part of their lengths, as shown. The materials, dimensions and degree of twist may be as stated in Example 1.

The fabric 13 shown in Figure 5 is a plain weave fabric in which every third warp thread 15 and every third pair of weft threads 16 is a compound strand containing both a thermoplastic material and a stretch resisting component. These threads 15, 16 may be constituted by the strands 7 or 10 of Figures 1 to 4. The remaining warp threads 14 and the remaining weft threads 17 are composed of a material which, like the stretch resisting constituent of threads 15 and 16, is not damaged by the degree of heat required to render the thermoplastic constituent of threads 15, 16 adhesive. In the particular fabric illustrated the disposition of the thermoplastic containing strands is that described and illustrated in applicant's copending application Serial No. 311,140, but the compound, thermoplastic containing strands may be distributed through the fabric in other ways.

The assembly shown in Figure 6 comprises a layer 13 of the fabric shown in Figure 5 interposed between two other fabric layers 18 and 19. The material of the outer fabric layers 18, 19 may be identical with that forming the threads 14, 17 of fabric 13 and/or that constituting the stretch resistant component of threads 15, 16, the material of layers 18, 19 being in all cases undamaged by the degree of heat required to render adhesive the thermoplastic constituent of threads 15, 16. The layers 18, 13 and 19 have been adhesively united together to constitute a so-called fused fabric assembly by superimposing the plies as shown and pressing them together with the application of a degree of heat sufficient to render adhesive the thermoplastic constituent of threads 15, 16 but insufficient to damage the remaining material or materials of the assembly.

It is to be remarked that for the purposes of the present invention cellulose acetate is to be regarded as a non-thermoplastic material, since when not treated with a solvent or plasticiser it does not soften sufficiently to become adhesive at any temperature to which the fabrics are subjected in practice. Since solvents or plasticisers which would affect rayon yarns are not employed when using interlinings in accordance with the present invention, the fabric plies which are fused together by the interlinings may also be composed wholly or in part of such yarn.

The polythene used in the interlinings is preferably a high polymer, having an average molecular weight of not less than about 15,000. When the fused fabric assemblies made from the interlinings are ironed after washing, the polythene is again melted or softened and if a soft polythene, having an average molecular weight of (say) 13,000 has been employed, sufficient polythene may sweat through onto the surface of the article to cause unsightly discolourations after a few launderings. By employing a hard polythene having an average molecular weight of (say) 20,000 this effect is eliminated or greatly reduced in extent.

I claim:

1. A mixed textile fabric for use in the production of fused fabric assemblies, said fabric comprising strands including as one constituent a thermoplastic structure which melts or softens sufficiently to become adhesive, upon heating to a temperature to which the other constituents of the fabric can be subjected without damage, this thermoplastic structure having its molecules arranged at random so that it will not contract to any substantial extent upon heating said strands including as another constituent a material which forms a unitary structure with said thermoplastic constituent, and, owing to its lower extensibility than the thermoplastic material, resists stretching of the strand, which would result in at least partial orientation of the thermoplastic material.

2. A fabric as claimed in claim 1, in which compound threads of the fabric comprise at least one thread of thermoplastic material laid up with at least one thread of the material of lower extensibility.

3. A fabric as claimed in claim 1, in which the thermoplastic material is in the form of a coating applied to threads of a material of lower extensibility.

4. A fabric as claimed in claim 1, in which the thermoplastic material is polythene having a melting point of about 105° C.

5. A fabric as claimed in claim 1, in which the thermoplastic material is polythene having an average molecular weight of not less than 15,000.

6. A mixed textile fabric as claimed in claim 1, comprising strands including thermoplastic materials and strands composed wholly of non-thermoplastic materials.

7. Fused fabric assembly comprising a fabric as claimed in claim 6, as an interlining, and non-thermoplastic fabric ply adhered to at least one face of the interlining.

8. Fused fabric assembly comprising a fabric as claimed in claim 1, as an interlining, and non-thermoplastic fabric ply adhered to at least one face of the interlining.

References Cited in the file of this patent

UNITED STATES PATENTS

| | | |
|---|---|---|
| 2,210,774 | Perrin et al. | Aug. 6, 1940 |
| 2,260,024 | Hall et al. | Oct. 21, 1941 |
| 2,262,861 | Rugeley et al. | Nov. 18, 1941 |
| 2,313,058 | Francis | Mar. 9, 1943 |
| 2,313,173 | Schneider et al. | Mar. 9, 1943 |
| 2,364,467 | Nickerson | Dec. 5, 1944 |
| 2,417,453 | Wade | Mar. 18, 1947 |
| 2,450,948 | Foster | Oct. 12, 1948 |
| 2,460,674 | Bihaly | Feb. 1, 1949 |
| 2,466,808 | Henning et al. | Apr. 12, 1949 |
| 2,486,469 | French | Nov. 1, 1949 |
| 2,514,187 | Bosomworth | July 4, 1950 |
| 2,536,163 | Feild et al. | Jan. 2, 1951 |
| 2,555,261 | Walters | May 29, 1951 |
| 2,610,927 | Foulds | Sept. 16, 1952 |
| 2,663,652 | Railing | Dec. 22, 1953 |
| 2,678,284 | Holt | May 11, 1954 |
| 2,755,535 | Schoenberger | July 24, 1956 |